United States Patent
Reitano

(10) Patent No.: US 12,529,372 B2
(45) Date of Patent: Jan. 20, 2026

(54) CONFIGURABLE GRAPHICAL VIBRATION BAND ALARM FOR PUMP MONITORING

(71) Applicant: ITT MANUFACTURING ENTERPRISES LLC, Wilmington, DE (US)

(72) Inventor: James Reitano, Farmington, NY (US)

(73) Assignee: Poseidon Systems, LLC, Victor, NY (US)

(*) Notice: Subject to any disclaimer, the term of this patent is extended or adjusted under 35 U.S.C. 154(b) by 509 days.

(21) Appl. No.: 17/919,045

(22) PCT Filed: Apr. 7, 2021

(86) PCT No.: PCT/US2021/026159
§ 371 (c)(1),
(2) Date: Oct. 14, 2022

(87) PCT Pub. No.: WO2021/221867
PCT Pub. Date: Nov. 4, 2021

(65) Prior Publication Data
US 2023/0235735 A1    Jul. 27, 2023

Related U.S. Application Data

(60) Provisional application No. 63/017,992, filed on Apr. 30, 2020.

(51) Int. Cl.
*F04B 49/10*    (2006.01)
*F04B 51/00*    (2006.01)
*G01H 1/00*     (2006.01)

(52) U.S. Cl.
CPC ............ *F04B 49/10* (2013.01); *F04B 51/00* (2013.01); *G01H 1/003* (2013.01)

(58) Field of Classification Search
CPC .......... F04B 49/10; F04B 51/00; G01H 1/003
See application file for complete search history.

(56) References Cited

U.S. PATENT DOCUMENTS

| | | | |
|---|---|---|---|
| 5,922,963 | A | 7/1999 | Piety et al. |
| 6,330,525 | B1 | 12/2001 | Hays et al. |
| | | (Continued) | |

FOREIGN PATENT DOCUMENTS

| | | |
|---|---|---|
| CN | 104316162 A | 1/2015 |
| CN | 107064796 A | 8/2017 |
| CN | 208579837 U | 3/2019 |

OTHER PUBLICATIONS

European Search Report Application No. 21797082.1 mailed Mar. 8, 2024.

(Continued)

*Primary Examiner* — Stephen D Meier
*Assistant Examiner* — Leo T Hinze

(57) ABSTRACT

Technologies are generally described for a vibration band alarm configuration tool to facilitate efficient and reliable setting configuration by displaying data and analyses pertaining to the data produced by a vibration transducer attached to a rotating machine and thereby reduces needed knowledge of machinery and vibration analysis. Various parameters and data sets may be calculated from the time domain waveform and displayed with collected data to simplify the recognition of features that represent system components and anomalies pertinent to the health of the rotating machine such as a pump assembly. Manually manipulatable controls on a graphic user interface may allow a user to set alarm bands and thresholds. Suggestions based on physical and/or statistical models, as well as, machine-specific historic data may be presented as well.

19 Claims, 6 Drawing Sheets

(56) References Cited

U.S. PATENT DOCUMENTS

| | | |
|---|---|---|
| 6,694,285 B1 | 2/2004 | Choe et al. |
| 2002/0077779 A1 | 6/2002 | Liebl et al. |
| 2009/0037013 A1* | 2/2009 | Hendler ........... G05B 19/41875 |
| | | 700/103 |
| 2011/0178737 A1 | 7/2011 | Hudson et al. |
| 2011/0201911 A1 | 8/2011 | Johnson et al. |
| 2014/0091940 A1 | 4/2014 | Johnson et al. |
| 2019/0203729 A1 | 7/2019 | Nishimura et al. |
| 2019/0324431 A1 | 10/2019 | Cella et al. |

OTHER PUBLICATIONS

International Search Report and Written Opinion for International App No. PCT/US21/26159, mailed on Jun. 29, 2021, pp. 11.
Chinese Office Action for Chinese Application 202180030779.X (Issued Jun. 27, 2025).

* cited by examiner

CONFIGURABLE GRAPHICAL VIBRATION BAND ALARM FOR PUMP MONITORING

CROSS-REFERENCE TO RELATED APPLICATIONS

The present application is a U.S. National Stage filing under 35 U.S.C. § 371 of International Application PCT/US2021/026159, filed Apr. 7, 2021, which claims the benefit of U.S. Provisional Patent Application Ser. No. 63/017,992 filed on Apr. 30, 2020. The disclosures of the above application are hereby incorporated by reference for all purposes.

BACKGROUND

Unless otherwise indicated herein, the materials described in this section are not prior art to the claims in this application and are not admitted as prior art by inclusion in this section.

Rotating machinery such as centrifugal pumps, fans, rotors, and similar ones include bearings to provide stability, mechanical efficiency, and structural configuration. Bearing assemblies in centrifugal pumps and other rotational machines may be configured to include sealed lubrication to protect moving components. Yet, as any machine with moving components, bearing assemblies are subject to failure over their lifetime. Failure of the bearing assembly may result in termination of operation for the rotating machine or worse, catastrophic failure of the machine.

SUMMARY

The present disclosure generally describes Fast Fourier Transform (FFT) based configurable graphical vibration band alarms for pump monitoring and underlying systems.

According to some examples, a monitoring system for a pump assembly to provide graphically defined frequency band alarms is described. The monitoring system may include a vibration sensor mounted in a housing of the pump assembly; and a computing device communicatively coupled to the vibration sensor. The computing device may include a communication sub-system to facilitate communication with the vibration sensor and a remote device; a memory configured to store instructions; and a processor coupled to the communication sub-system and the memory. The processor, in conjunction with the instructions stored in the memory, may be configured to receive external data associated with the pump assembly; receive vibration data from the vibration sensor; generate a recommended frequency alarm band and a corresponding threshold based on the received external data and the vibration data; generate a frequency domain graph based on the received vibration data; display the generated frequency domain graph on a graphical user interface with the generated recommended frequency alarm band and the corresponding threshold; provide one or more controls on the graphical user interface to manipulate the recommended frequency alarm band and the corresponding threshold; and display an updated frequency domain graph and associated information in response to receiving manipulation input through the one or more controls.

According to other examples, the processor may be configured to receive the vibration data from the vibration sensor as time domain data and convert to frequency domain data or receive the vibration data from the vibration sensor as frequency domain data. The processor may be configured to generate the recommended frequency alarm band and the corresponding threshold by providing a start frequency, an end frequency, and the threshold to be superimposed with the frequency domain graph displayed on the graphical user interface, where the one or more controls on the graphical user interface comprise slider buttons configured to allow the user to modify values of the start frequency, the end frequency, and the threshold. The processor may be further configured to display a computed current threshold in conjunction with the recommended frequency alarm band; and re-compute the computed current threshold in response to receiving a manipulation of the recommended frequency alarm band. The processor may be further configured to display one or more of a run speed, bearing fault frequency, and a vane pass of the pump assembly captured at a time of vibration data capture; and select a unit of the threshold and a computed current threshold to be displayed based on a frequency range of the frequency alarm band.

According to further examples, the processor may be further configured to receive a plurality of vibration data sets captured at different time points and along multiple orthogonal axes; and present the plurality of vibration data sets for selection to be displayed on the graphical user interface. The external data may be stored in a database communicatively coupled to the computing device and include historical data comprising one or more of generic pump specifications, specific pump specifications, historic performance data for the pump, or historic failure data for the pump, and environmental data comprising one or more of ambient temperature, ambient humidity, ambient pressure, ambient vibration levels, fluid pressure, fluid temperature, fluid viscosity, or a supply power condition. The vibration data may be captured by the one or more vibration sensors periodically, on-demand, or continuously.

According to yet other examples, a method to provide graphically defined frequency band alarms for a pump assembly is described. The method may include receiving external data associated with the pump assembly; receiving vibration data from a vibration sensor mounted in a housing of the pump assembly; generating a recommended frequency alarm band and a corresponding threshold based on the received external data and the vibration data; generating a frequency domain graph based on the received vibration data; displaying, through a computing device communicatively coupled to the vibration sensor, the generated frequency domain graph on a graphical user interface with the generated recommended frequency alarm band and the corresponding threshold; providing one or more controls on the graphical user interface to manipulate the recommended frequency alarm band and the corresponding threshold; and displaying, through the computing device, an updated frequency domain graph and associated information in response to receiving manipulation input through the one or more controls.

According to some examples, the method may further include generating the recommended frequency alarm band and the corresponding threshold by providing a start frequency, an end frequency, and the threshold to be superimposed with the frequency domain graph displayed on the graphical user interface, where the one or more controls on the graphical user interface comprise slider buttons configured to allow the user to modify values of the start frequency, the end frequency, and the threshold. The method may also include displaying a computed current threshold in conjunction with the recommended frequency alarm band; and re-computing the computed current threshold in response to receiving a manipulation of the frequency alarm band. The method may further include displaying one or more of a run speed, bearing fault frequency, and a vane pass of the pump assembly captured at a time of vibration data capture; and selecting a unit of the threshold and a computed current threshold to be displayed based on a frequency range of the frequency alarm band.

According to other examples, the method may further include receiving a plurality of vibration data sets captured at different time points and along three orthogonal axes; and presenting the plurality of vibration data sets for selection to be displayed on the graphical user interface. The method may also include generating multiple recommended frequency alarm bands and corresponding thresholds based on the received external data and the vibration data; displaying, through the computing device, the generated frequency domain graph with the generated recommended frequency alarm bands and the corresponding thresholds; and providing one or more controls on the graphical user interface to manipulate for each of the recommended frequency alarm bands and the corresponding thresholds. The method may also include configuring the vibration sensor to collect vibration data periodically, on-demand, or continuously.

According to further examples, an interactive graphical user interface to provide graphical frequency alarm bands for a rotating machine is described, where the graphical user interface is displayed through a computing device communicatively coupled to a vibration sensor. The graphical user interface may include a frequency domain graph that represents vibration data received from the vibration sensor mounted in a housing of the rotating machine; one or more operational parameter values captured at a time of capture of the vibration data; a frequency alarm band indicated by a start frequency and an end frequency; a threshold for the frequency alarm band, wherein the frequency alarm band and the threshold are generated based on the received vibration data; a computed current threshold in conjunction with the frequency alarm band; and interactive controls associated with the start frequency, the end frequency, and the threshold to allow a user to manipulate the start frequency, the end frequency, and the threshold.

According to some examples, the vibration data may be received from the vibration sensor as time domain data and converted to frequency domain data or received from the vibration sensor as frequency domain data. The interactive controls may include slider buttons manipulatable by one or more of a touch input, a mouse input, a keyboard input, an eye tracking input, or a voice input. The computed current threshold may be re-computed in response to receiving a manipulation of the frequency alarm band; and a unit of the threshold and the computed current threshold may be selected based on a frequency range of the frequency alarm band. The graphical user interface may further include a selection of a plurality of vibration data sets captured at different time points and along different orthogonal axes. The rotating machine may be a pump, a motor, a fan, or a rotor.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
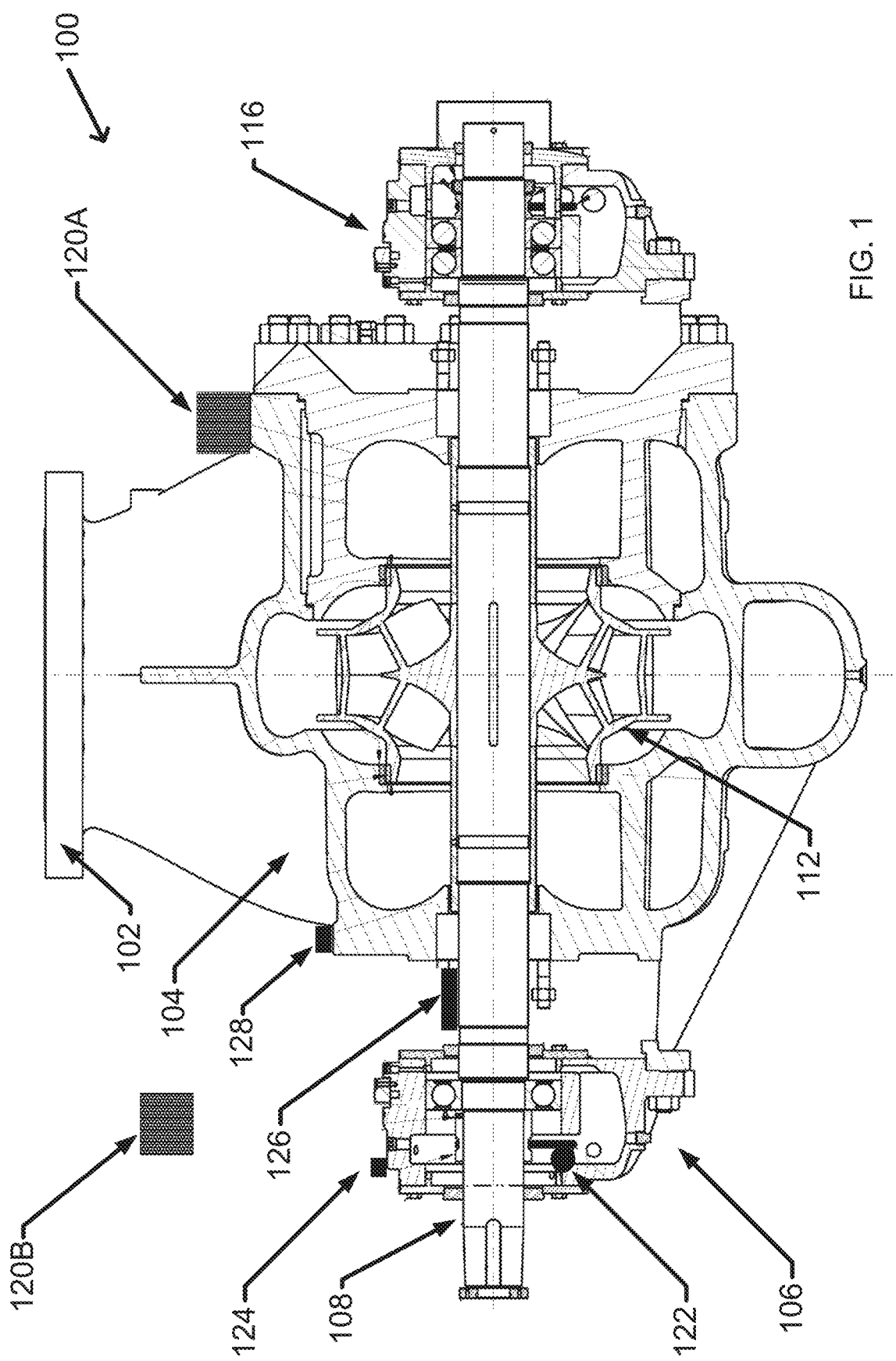
FIG. 1 illustrates an example rotating machine, a single-stage, radially-split pump with an integrated vibration monitoring system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems and/or devices related to FFT based configurable graphical vibration band alarms for pump monitoring and underlying systems.

Briefly stated, technologies are generally described for a vibration band alarm configuration tool to facilitate efficient and reliable setting configuration by displaying data and analyses pertaining to the data produced by a vibration transducer attached to a rotating machine and thereby reduces needed knowledge of machinery and vibration analysis. Various parameters and data sets may be calculated from the time domain waveform and displayed with collected data to simplify the recognition of features that represent system components and anomalies pertinent to the health of the rotating machine such as a pump assembly. Manually manipulatable controls on a graphic user interface may allow a user to set alarm bands and thresholds. Suggestions based on physical and/or statistical models, as well as, machine-specific historic data may be presented as well.

FIG. 1 illustrates an example rotating machine, a single-stage, radially-split pump with an integrated vibration monitoring system in accordance with at least some embodiments described herein.

As illustrated in FIG. 1, an example single-stage pump 100 may include a port 102 (intake or output), a casing 104, a first bearing housing 106, a shaft 108, an impeller 112, and second bearing housing 116. The example pump 100 may also include one or more vibration sensors 124, 126, 128, as well as, other sensors such as temperature sensor 122, and monitoring modules 120A and/or 120B.

In an operation, fluids may enter axially through an intake port 102, and be pushed tangentially and radially outward until leaving through circumferential parts of the impeller 112 into the diffuser part of the casing 104. The fluids may gain both velocity and pressure while passing through the impeller 112. In some cases, the first bearing housing 106 may contain radial bearings and the second bearing housing 116 may include axial (thrust) bearings. In operation, the impeller 112 (and the shaft 108) is subject to different forces. While an ideal impeller would only receive rotational force from the shaft 108, axial thrust caused by unequal distribution of pressure between the front and back shrouds of an impeller (difference between the discharge pressure and suction pressure) may result in the impeller being pushed transversally to the shaft axis. The axial thrust load may result in vibration and loss of power transmission, as well as reduce expected life of pump bearings (and/or shaft). The bearings in the first bearing housing 106 and the second bearing housing 116 may, thus, be subject to detrimental forces such as thrust, vibration. Furthermore, oil or similar lubricants used inside the bearing housings may leak out or be contaminated (e.g., by shavings from the bearings). Reduction of oil volume, moisture build-up, or contamination may reduce an effectiveness of the lubricant and further worsen vibration.

In some examples, various sensors (e.g., temperature sensor 122) may be placed in or on the bearing housing to monitor pump health (e.g., measure oil and/or frame temperature). Vibration in the pump assembly (including the bearing housing) may indicate potential problems such as unbalance, bearing defects, gear defects, blade/impeller faults, structural resonance problems, rubbing, loss of lubrication, oil whirl, cavitation/recirculation problems, machine distress and/or seal distress. Thus, an increase in vibration levels may be indicative of pending failure. Based on an analysis of detected vibration levels, alerts may be issued, or corrective actions may be taken before a catastrophic failure.

In some examples, one or more vibration sensors 124, 126, 128 may be placed at suitable locations on the pump assembly to detect vibration of various parts such as bearing housing, shaft, impeller, pump housing, etc. A monitoring module (120A or 120B) may be placed onto the bearing housing or be remotely located. The monitoring module may receive sensor information from the various sensors including the vibration sensors and perform analysis and take actions based on the analysis, or the monitoring module may provide raw and/or processed sensor data to a remote computing device for analysis and actions based on analysis results. For example, detected time domain vibration data may be processed through FFT into frequency domain either at the sensors or at the monitoring module(s). Alerts may then be set based on the FFT data.

Other sensors that may be employed to detect operational aspects of the bearings may include an oil level sensor to detect oil level in the bearing housing, a humidity sensor to detect presence of water in the oil, a contamination sensor to detect contaminants in the oil, and/or a magnetic sensor to detect speed of the shaft.

While examples are discussed using specific pumps, sensors, and communication media herein, embodiments are not limited to the example configurations. A system to monitor operational aspects of a rotating machine with configurable graphical alarm bands may be implemented in various pump types such as overhung pumps, single- or multi-stage pumps, axially split between bearing pumps, radially split barrel multi-stage pumps, vertical, double casing pumps, and similar ones. The components of the system may communicate through various wired or wireless communication media employing suitable communication protocols. Embodiments may also be implemented in other forms of rotating machines that utilize a shaft such as rotors, fans, etc.

Figure 2:
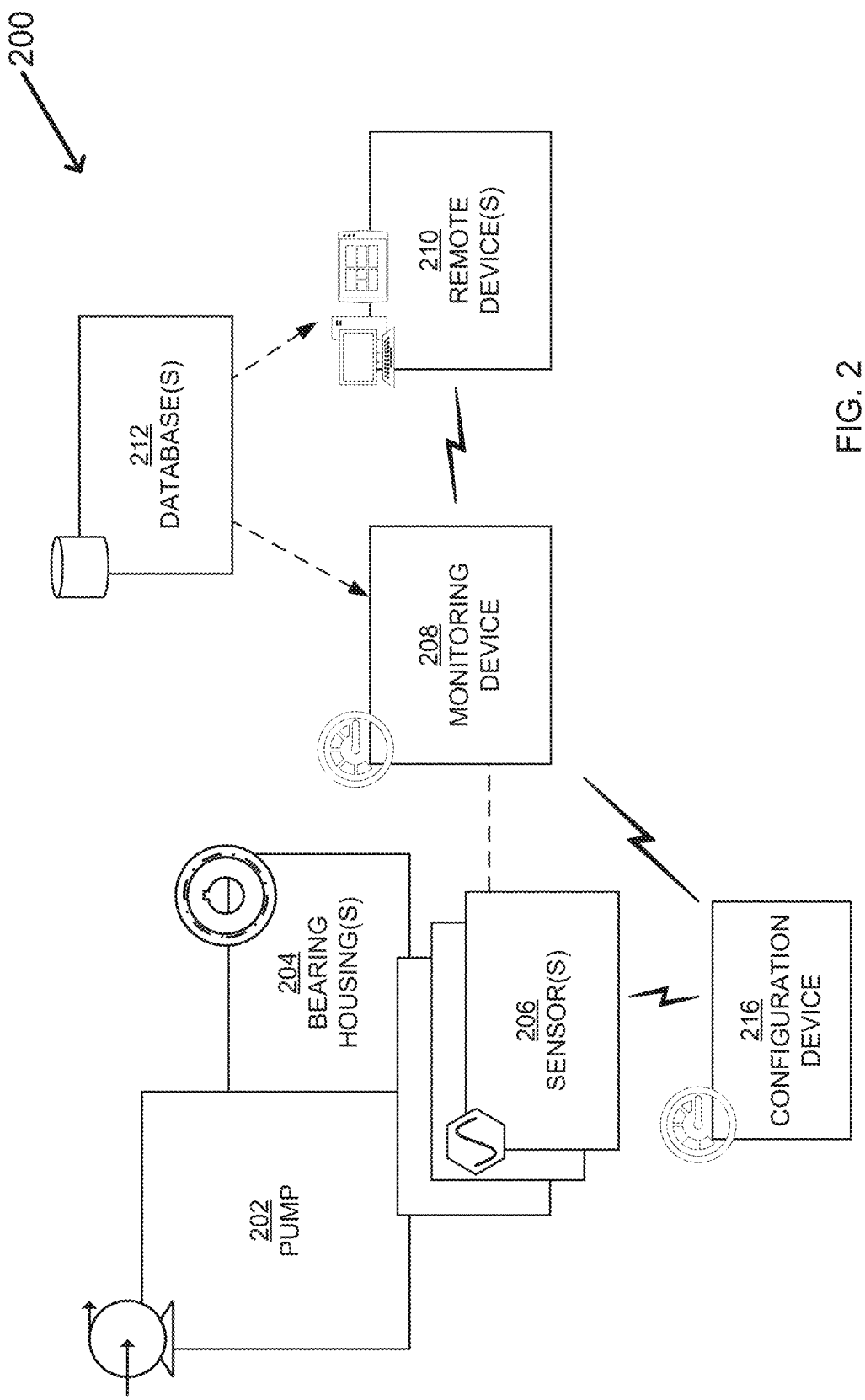
FIG. 2 is a block diagram conceptually illustrating major components of an integrated monitoring system for a centrifugal pump.

FIG. 2 is a block diagram conceptually illustrating major components of an integrated monitoring system for a centrifugal pump, arranged in accordance with at least some embodiments described herein.

System 200 in FIG. 2 includes a centrifugal pump 202, one or more bearing housings 204, sensors 206, monitoring device 208, and remote device 210. The sensors 206 may communicate with the monitoring module 208 via wired or wireless communication media. A configuration device 216 may be used to configure the sensors 206 and/or the monitoring device 208. The monitoring device 208 may communicate with the remote device(s) 210 and provide time domain data or frequency domain data from the sensors 206. In some examples, additional data such as historic failure or performance data may be provided from database(s) 212 to the monitoring device 208 and/or the remote device(s) 210.

Centrifugal pump 202 may be of any type described herein, but also represents other rotating machines. Bearing housing 204 is mechanically coupled to the pump 202. In some examples, multiple bearing housings may be integrated with the pump 202. Sensors 206 may be placed in or on the pump assembly including the bearing housing(s) 204 and may be used to detect vibration of various portions of the pump assembly. Sensor(s) 206 may be communicatively coupled to the monitoring device 208 and/or the configuration device 216 through wired or wireless, electrical or optical communication media. For example, various wireless communication protocols such as near-field communication, various area networks (LAN, PAN, Bluetooth®, etc.), and similar ones may be used. The communication between the sensors and the monitoring device and/or the configuration device may be one-directional (e.g., sensor to monitoring device) or bi-directional (e.g., configuration device may configure, reset, or otherwise control the sensors). Remote device 210 may be a desktop computer, a server, a portable computer, or a special purpose device (e.g., pump controller) communicatively coupled to the monitoring device 208 via communication media, which may be similar to the communication media between the sensors and the monitoring device or different. For example, in cases where the monitoring device 208 is located at the pump 202, the communication media may be suitable for short-distance communication, and if the remote device 210 is located far away from the pump, the communication media may be suitable for longer-distance communication (e.g., WLAN, cellular communication, satellite communication, etc.). In some examples, monitoring device 208 may also be integrated with the remote device 210.

Rotating machinery such as motors, fans, rotors, and pumps include various components which may undergo wear or have equipment defects which cause failure of the components. Such components include bearings and seals which prevent leakage of the process fluid being pumped into the pump components along the shaft, for example. Any failures of the components of the rotating equipment may cause significant expense in the repair of the equipment as well as down time for the facility, where the machinery is installed. A monitoring system according to examples may detect various operational aspects of a rotating machine through vibration sensors placed in or on a bearing housing and other locations on the machinery and determine machine health based on an analysis of the detected aspects. The system may use general equipment information and/or machine specific historic data to analyze sensor information and determine actions such as alerts, reports, predictions, and/or suggest corrective actions.

In some examples, vibration data may be collected in orthogonal directions (for example, axial and radial directions) and indicate potential problems such as unbalance, bearing defects, gear defects, blade/impeller faults, structural resonance problems, rubbing, loss of lubrication, oil whirl, cavitation/recirculation problems, machine distress and/or seal distress as mentioned above. For example, an increase in vibration levels may be indicative of pending failure. Based on an analysis of detected vibration levels in light of machine specific historic data, a system according to examples may predict failure within an estimated time window and issue an alert and/or suggest corrective action.

The ability to monitor and set alarms that are focused on specific sections of a vibration frequency spectrum may allow a user to focus the monitoring system on known conditions within a system. Setting such focused bands and their corresponding thresholds may be a cumbersome and confusing process for inexperienced users as it may require experience with vibration analysis and a detailed knowledge of the machine's operating and setup parameters such as run speed, maximum acceptable vibration, bearing fault frequencies, etc.

Utilizing graphical control tools, such as sliders or buttons, superimposed over a calculated frequency spectrum plot according to examples may draw the user's attention to areas that contain the energy and are likely where the bands should be focused. The sliders may provide an efficient approach of changing the settings while providing visual feedback that the areas of concern are contained within the current settings. To further aid the user, the system may display historical or user provided data, other computed values such as run speed, and additional graphical tools such as harmonic cursors. The system may determine a recommended configuration based on available data and information for a particular machine and default the settings to these values.

In some examples, sensors 206 may collect time domain vibration data and convert to frequency domain (FFT), then provide to the monitoring device 208 and/or configuration device 216. The monitoring device 208 and/or configuration device 216 may process the FFT data and display to a user to configure alarm bands and perform other actions such as adjust machine parameters, sensor parameters, etc. In other examples, the sensors 206 may provide the time domain data to the monitoring device 208 and/or configuration device 216, which may perform the frequency domain conversion. In both scenarios, the remote device(s) 210 receiving data from the monitoring device 208 (and database(s) 212) may also display the FFT data to a user to configure alarm bands and perform further actions.

In an example configuration, the monitoring device 208, the configuration device 216, and/or the remote device(s) 210 may include one or more processors and a system memory. A memory bus may be used to communicate between the processor and the system memory. Depending on the desired configuration, the processor may be of any type, including but not limited to a microprocessor (µP), a microcontroller (µC), a digital signal processor (DSP), or any combination thereof. The processor may include one or more levels of caching, such as a cache memory, a processor core, and registers. The processor core may include an arithmetic logic unit (ALU), a floating point unit (FPU), a digital signal processing core (DSP core), or any combination thereof. A memory controller may also be used with the processor, or in some implementations, the memory controller may be an internal part of the processor. The processor may further include an FFT interface, a data capture module, and similar components to capture the sensor data, perform frequency domain conversion, and further process the data.

Depending on the desired configuration, the system memory may be of any type including but not limited to volatile memory (such as RAM), non-volatile memory (such as ROM, flash memory, etc.) or any combination thereof. The system memory may include an operating system, a monitoring application, and program data. The monitoring module 208 may have additional features or functionality, and additional interfaces to facilitate communications with other devices and interfaces such as external data sources and remote devices. For example, a bus/interface controller may be used to facilitate communications between the processor and one or more data storage devices via a storage interface bus. The data storage devices may be one or more removable storage devices, one or more non-removable storage devices, or a combination thereof. Examples of the removable storage and the non-removable storage devices include magnetic disk devices such as flexible disk drives and hard-disk drives (HDDs), optical disk drives such as compact disc (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

The monitoring device 208, the configuration device 216, and/or the remote device(s) 210 may also include an interface bus for facilitating communication from various interface devices (e.g., one or more output devices, one or more sensor interfaces, and one or more remote devices) such as a communication sub-system. Some of the example output devices may include a graphics processing unit and an audio processing unit, which may be configured to communicate to various external devices such as a display or speakers via one or more A/V ports. One or more example sensor interfaces may include a serial interface controller or a parallel interface controller, which may be configured to communicate with sensors and/or input devices (e.g., keyboard, mouse, pen, voice input device, touch input device, etc.). For example, the controls on the graphical user interface (associated with start frequency, end frequency, and threshold of each alarm band) may be manipulated through a touch input, gesture input, eye tracking input, mouse input, keyboard input, or voice input. The communication sub-system may include a network controller, which may be arranged to facilitate communications with one or more other computing devices over a network communication link via one or more communication ports.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include non-transitory storage media.

Figure 3:
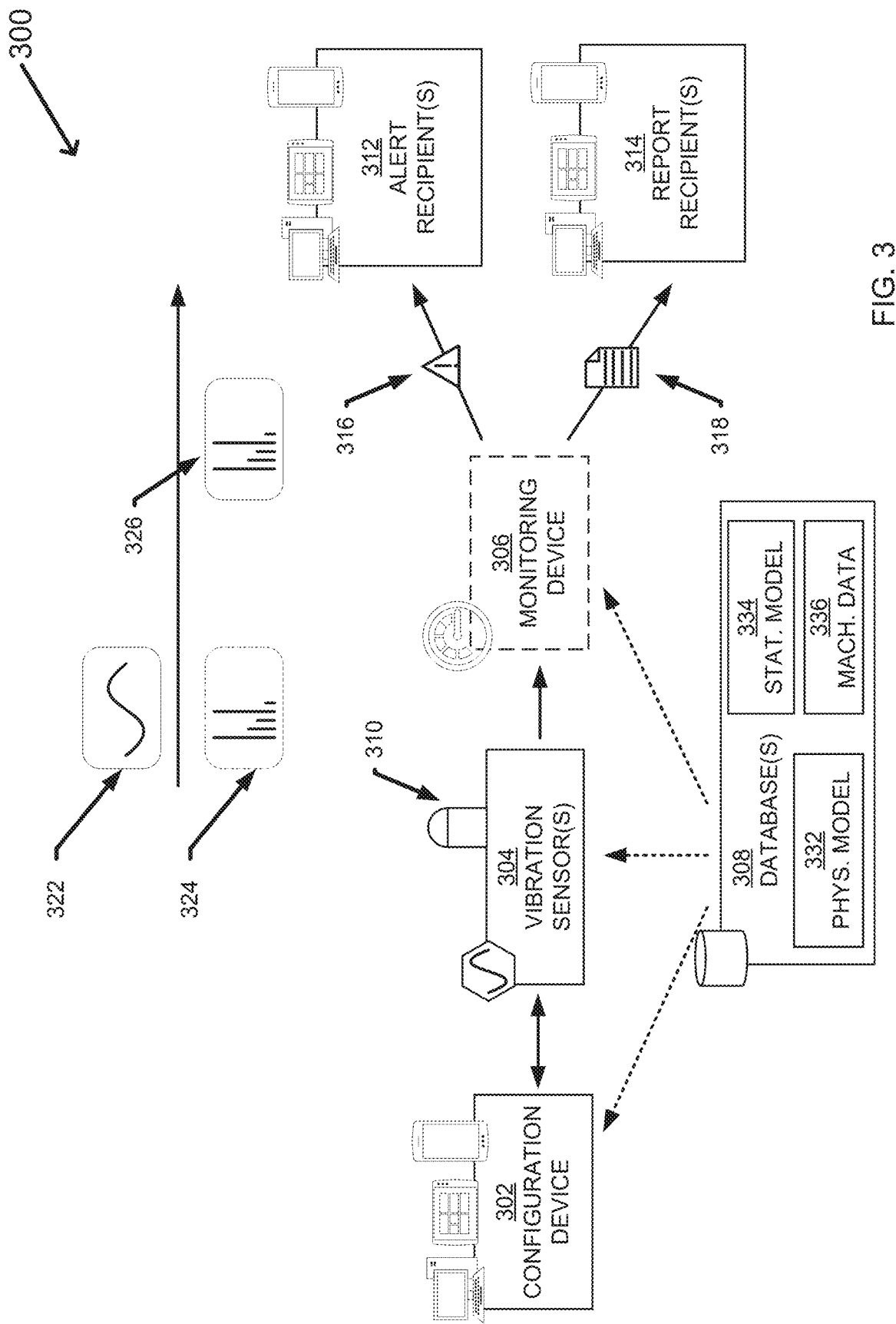
FIG. 3 is a conceptual illustration of various example components and interactions between the components of a monitoring system employing configurable graphical vibration band alarms.

FIG. 3 is a conceptual illustration of various example components and interactions between the components of a monitoring system employing configurable graphical vibration band alarms, arranged in accordance with at least some embodiments described herein.

Diagram 300 of FIG. 3 includes configuration device 302, vibration sensor(s) 304, monitoring device 306, database(s) 308, alert recipient(s) 312, and report recipient(s) 314. In some cases, one or more of the vibration sensors may include an integrated alarm device 310 such as a visual alert device, a sound alert device, etc. Monitoring device 306 may provide alert(s) 316 to the alert recipient(s) 312, which may include desktop computing devices, portable devices, smart phones, etc. Monitoring device 306 may also provide report(s) 318 to the report recipient(s) 314, which may include desktop computing devices, portable devices, smart phones, etc. In some cases, the vibration sensor(s) 304 may provide time domain data 322 or frequency domain data 324 to the monitoring device 306, which in turn may provide frequency domain data 326 to the alert recipient(s) 312 or report recipient(s) 314.

A user may be enabled to set alarm bands on the frequency domain data using graphical tools according to examples and transmit the alert(s) 316 to the alert recipient(s) 312. Similarly, the monitoring device 306 may generate reports and transmit the report(s) 318 to the report recipient(s) 314.

Database(s) 308 may store generic equipment information such as pump specifications; machine-specific information such as each particular pump's failure history, performance history, load history, etc.; and/or environmental information such as ambient temperature, ambient humidity, ambient pressure, ambient vibration levels, pumped fluid pressure, pumped fluid temperature, pumped fluid viscosity, or a supply power condition (e.g., voltage level changes, power line noise), etc. In some examples, some of the aforementioned information such as generic equipment information may be stored at the monitoring device 306 and/or configuration device 302. Database(s) 308 may also store physics-based vibration analysis models 332, statistical models 334 developed from machine health monitoring data, and/or machine-specific data 336, based on which recommended values for the start/end frequencies and/or thresholds may be determined.

Vibration sensor(s) 304 may detect vibration levels at one or more locations of the bearing housing or machine assembly. In some examples, different sensors may be integrated. Some of the sensors may be placed permanently inside or on the bearing housing or the machine assembly. Other sensors may be removable so that they can be replaced during a lifetime of the pump or rotating machine. The sensors may be configured to collect data periodically, on-demand, or continuously. In some cases, sensor data may be used for dynamic analysis, that is, decisions on pending failure or other equipment problems may not be made based on a fixed threshold of a single sensor. For example, vibration data may be evaluated in light of other sensor inputs such as frame temperature, oil temperature, oil contamination, etc.

In some examples, the monitoring device 306 and/or configuration device 302 may perform an analysis using physical, statistical, or machine-specific information based models and determine default values for start and end frequencies of alarm bands, as well as, thresholds for the suggested bands. The computed values may be displayed on a graphical user interface that presents selected FFT data to a user to allow the user to identify pertinent information and, if necessary, modify the settings from the default values. Historic data such as general equipment specifications or machine specific historic performance/failure information, as well as, environmental data may be used in the analysis. Furthermore, machine learning algorithms and/or artificial intelligence algorithms may be employed for the analysis. In other examples, machine-specific data may be collected and/or external data (e.g., predefined specifications, environmental data) may be retrieved during a calibration process and recommended default values computed as a result. For example, a calculation based on bearing specifications might determine the bearing fault frequencies and default a band around them. In further examples, the data may be collected during routine operation and the recommended default values computed. In addition to the analysis, the monitoring device 306 and/or configuration device 302 may manage the vibration sensors 304 by transmitting reset, configuration, or other instructions to the sensors. The monitoring device 306 and/or configuration device 302 may also manage power to themselves and/or the sensors. The power may be supplied by an external power source or a renewable power supply. For example, a power supply may generate power from the rotation of the shaft, from solar power, or battery power to supply the monitoring device 306, the configuration device 302, and/or the sensors 304.

Figure 4:
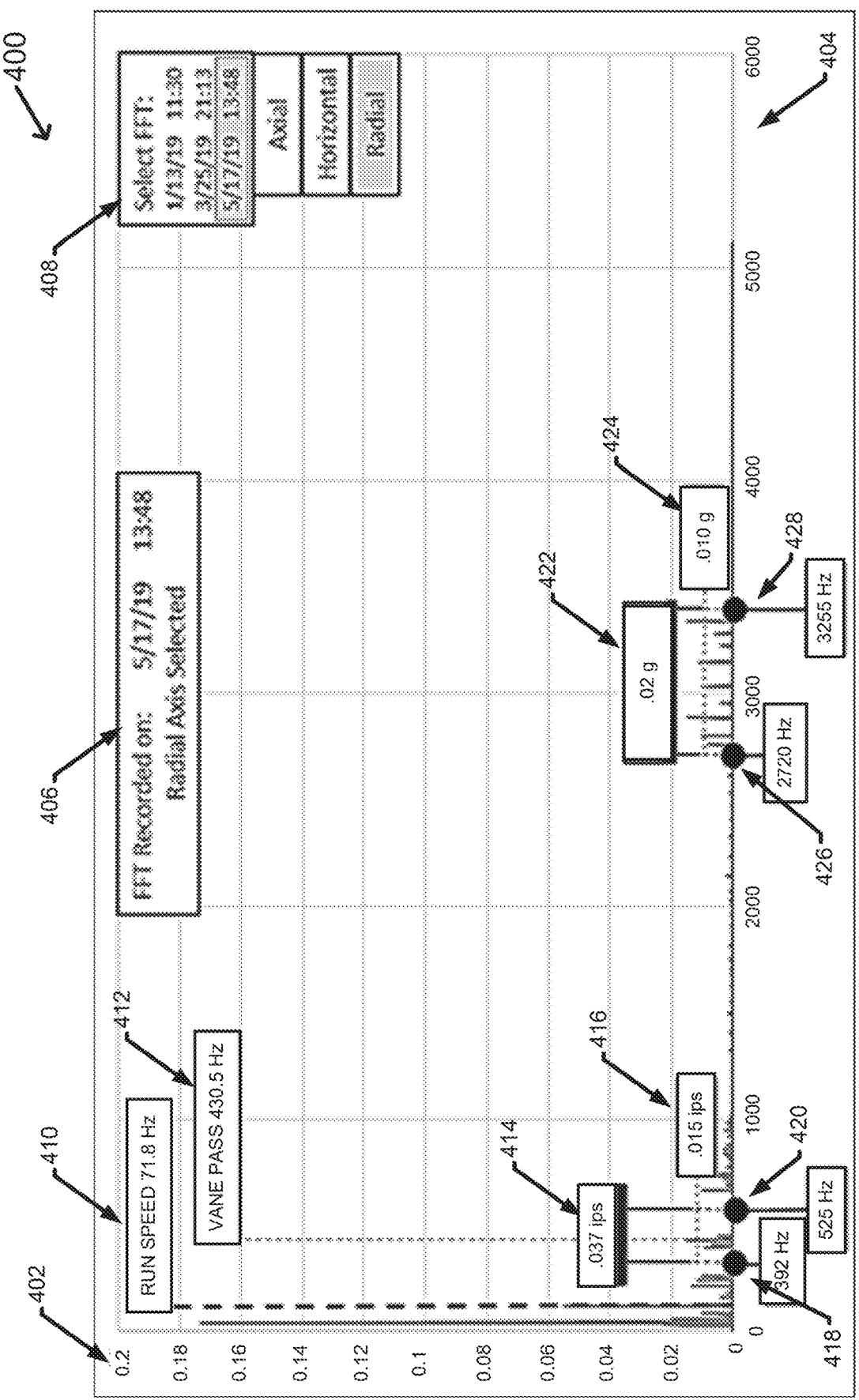
FIG. 4 is a screenshot of a graphical user interface displaying vibration data in FFT domain with selected band alarms and other pertinent information.

FIG. 4 is a screenshot of a graphical user interface displaying vibration data in FFT domain with selected band alarms and other pertinent information, arranged in accordance with at least some embodiments described herein.

The graphical user interface 400 shows a vibration plot of a rotating machine (e.g., a pump) along frequency axis 404 and amplitude 402. Title 406 provides information associated with the displayed data such as type of data, when the data was recorded, and parameters associated with the data. Key parameters 410 and 412 such as run speed and vane pass may be displayed on the graph along with display options 408 such as selection of available recorded data sets, type of data to be displayed etc. For example, available recorded data sets may be identified by date and time of recording. Types of data may include axial, horizontal, and radial vibration data recordings. Controls 418, 420 and 426, 428 such as sliders or buttons may be presented as default values based on analysis of recorded data (in light of historic, generic, machine-specific, and/or environmental data, for example) and be user manipulatable. Thus, a user may select an alarm band of interest by moving the controls along the frequency axis 404. Maximum allowable thresholds (414, 422) and/or current vibration (416, 424) values corresponding to the selected frequency bands (by controls 418, 420 and 426, 428) may also be displayed as velocity or acceleration to inform the user. Maximum allowable vibration threshold and/or the current vibration values may be a computed average such as root mean square (RMS).

Vibration data may be captured by the sensor(s) periodically, on-demand, or at random intervals and the captured data may be stored in time domain or converted to frequency domain and stored. The graphical user interface may present available data sets in form of a dropdown menu or similar list for user selection (e.g., display options 408). The list or dropdown menu showing the corresponding dates may allow the user to ensure the graph that is displayed is one that was recorded when a particular set of conditions was met or prompt the user to collect one before beginning. Once the user selects the graph to be displayed, they can then select the axis that may show the fault(s) they are trying to catch with their band alarm. For example, for a potential problem with the shaft, "axial" axis may be selected. With the selected options, the user may receive a picture of the vibration spectrum to guide them to setting the appropriate frequency alarm bands and thresholds.

Upon display of the selected FFT data, the user may set the start and end frequencies for available band alarms. The frequencies may be selected by sliding the "buttons" (e.g. controls 418, 420 or 426, 428) across the frequency axis 404 one at a time. The frequency values corresponding to the controls may be represented by the slider positions. As mentioned above, key parameters such as run speed or vane pass may be displayed on the graphical user interface. Run speed is a foundational component of vibration analysis. Displaying the run speed may allow the end user to determine the frequencies that represent a particular fault. Run speed may be displayed as text or a vertical line that stretches up from the frequency axis 404. For further graphical aid, the user may be allowed to toggle lines that represent the harmonics of the run speed on and off, so the user can easily identify the frequencies that represent harmonic faults.

Pressure pulsation are fluctuations in the basic pressure/head developed by a pump. The pulsations can sometimes be severe and cause damage to the pump. In centrifugal pumps, a pressure pulse may be developed as each rotating vane passes the cut water or diffuser vane reaching a maximum value when the vane tip passes this point. A change from minimum to maximum transfer of energy to the discharge nozzle may result in corresponding change or variations in the discharge pressure which constitute pressure pulsation. Thus, vane pass frequency is another key parameter that may be displayed along with the run speed to allow a user identify fault(s).

Vibration analysis techniques help to identify three major parameters: acceleration, velocity and displacement. Each of these parameters emphasizes certain frequency ranges in their own way and may be analyzed together to diagnose issues. Acceleration places greater importance on high frequencies and may be converted to velocity or displacement. Displacement, similar to acceleration, places greater importance on high frequencies, but also includes low frequencies. Displacement measurements are typically used when examining the broad picture of mechanical vibrations. For example, displacement may be used to detect unbalance in a rotating part due to a significant amount of displacement at the rotational frequencies of the machine's shaft. Velocity is related to the destructive force of vibration and places equal importance on both high and low frequencies. The value of velocity (e.g., an average such as RMS) may provide optimum identification of vibration severity.

As the controls (sliders) are moved across the frequency range, the system may compute the RMS vibration within those points from the displayed FFT data. A visual representation of this level may be added so the user knows how much energy is within the selected frequencies. If a maximum allowable RMS vibration for the band is not known, the information may allow the user to better determine appropriate thresholds. For example, if the spectrum was collected during a known good state, this level can be considered a baseline for that band.

In some examples, recommended values for the start/end frequencies and/or thresholds may be determined based on physics-based vibration analysis models 332, statistical models 334 developed from machine health monitoring data, and/or machine-specific data 336 stored at a database 308, for example. The recommended values may be displayed as defaults on the graphical user interface. The default values may save even more time and effort for inexperienced users.

In other examples, multiple band alarms may be set and displayed at one time. Each alarm may have a start slider (e.g., 418, 426), an end slider (e.g., 420, 428), a corresponding computed (current) RMS line (e.g., 416, 424), and a threshold line (e.g., 414, 424). The end user can configure each band alarm and then set them simultaneously. To accommodate frequency bands of different ranges, which may require working with different units, the graphical user interface may display an FFT of one unit that covers a section of the spectrum on the same graph as an FFT of another unit that covers another section of the spectrum (e.g., units of current RMS 416 and 424). Users may want higher frequency bands to be in acceleration and lower frequency bands in velocity. If the FFT data is not recorded using different units, the system may convert a section to the unit that corresponds to the likely desired unit (e.g., threshold 414 for lower frequency to ips or threshold 422 for higher frequency to g).

Figure 5:
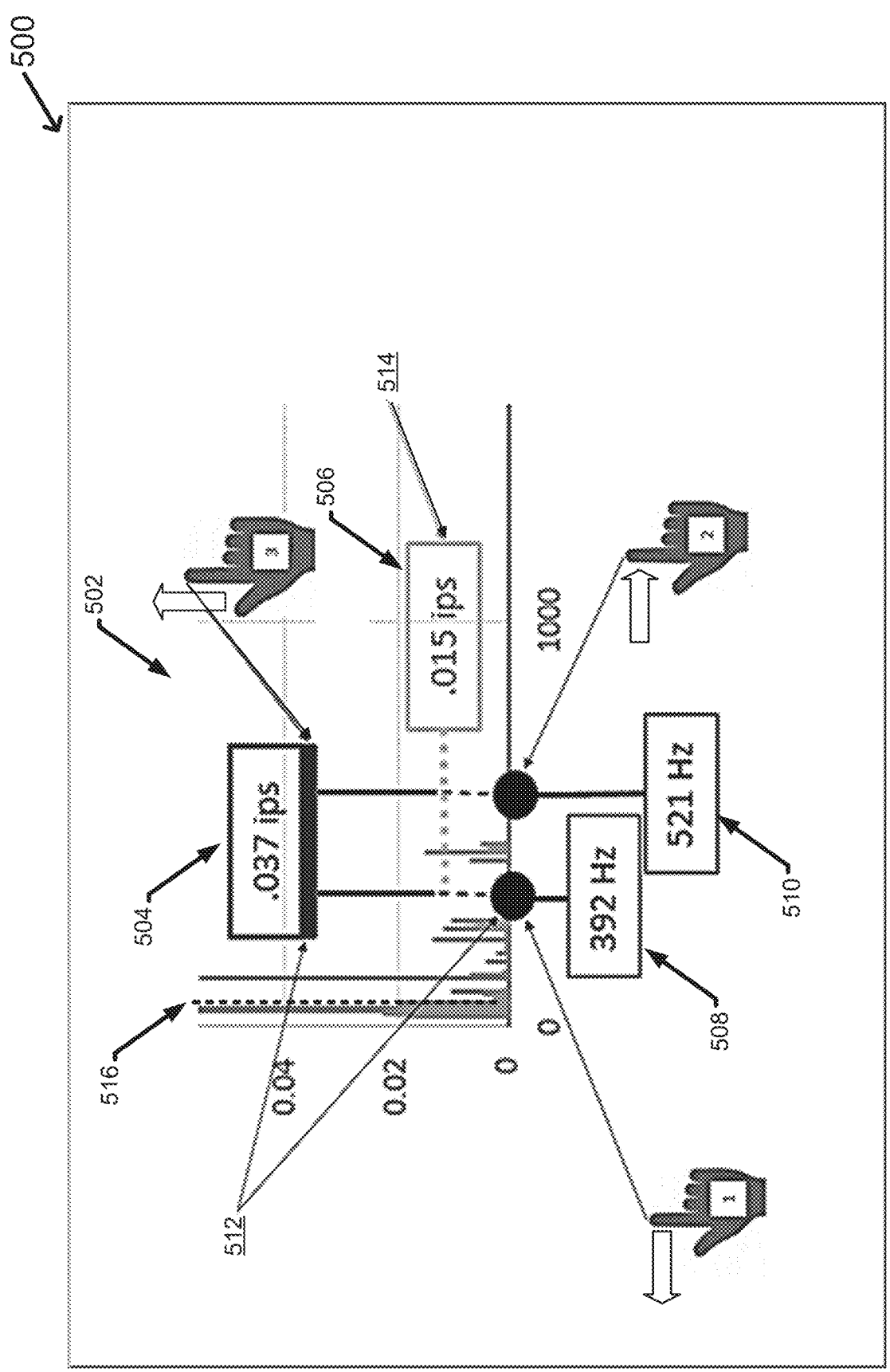
FIG. 5 conceptually illustrates configuration operations on an example graphical user interface displaying vibration data in FFT domain.

FIG. 5 conceptually illustrates configuration operations on an example graphical user interface displaying vibration data in FFT domain, arranged in accordance with at least some embodiments described herein.

Diagram 500 shows a portion of a displayed graphical user interface 502 with manipulation of controls (1, 2, 3). The portion of a displayed graphical user interface 502 includes FFT data in form of frequency spikes, a selected alarm band with start frequency 508 and end frequency 510, a threshold 504 corresponding to the selected alarm band, and a computed RMS 506 for the selected alarm band.

The default position for the frequency band and thresholds may be set to recommended default positions by the system based on various models as discussed previously (512). As the start and/or end frequencies for the selected alarm band are modified by a user, the current RMS 506 may be re-computed and displayed (514). Manipulations shown on diagram 500 include setting (1) of start frequency 508, setting (2) of end frequency 510, as well as, setting (3) of the maximum allowable vibration threshold 504 for the selected alarm band.

The graphical tools shown in FIG. 5 include the "frequency sliders", the controls that represent the start and end frequencies (508, 510) for each band. Current values of the controls may be displayed in text near the sliders. Computed RMS 506 may be displayed as a line that stretches across the start and end frequencies and has an amplitude that corresponds to the computed RMS within the selected band of the displayed FFT data. The computed RMS values may be displayed in text near the displayed computed RMS lines. Threshold 504 is "vertical bar slider" that stretches across the start and end frequencies for each band. The value of the threshold may default to a computed recommended value and allow the user to change it to a desired value from the default value. The threshold value may be displayed in text near the threshold slider bar. Run speed 516 may be displayed as a line that extends up from the frequency axis with a text box (not shown in this figure, but shown in FIG. 4) that shows the frequency that was previously computed from the displayed graph, using other data, or entered by the user to represent run speed at the time of displayed FFT data collection. The run speed line also becomes the fundamental frequency for displaying harmonics cursors. Harmonic cursors are vertical lines that stretch up from the frequency axis with the run speed as the fundamental frequency. A system according to examples, may allow a user to toggle harmonic cursors on and off. Represent the multiples of the run speed, these lines may be used to enhance the user's ability to recognize where common frequencies such as vane pass are located.

In one example scenario, an end user may have a pump that had a part replaced. They may want to monitor the band(s) associated with this component. An input to the tool may include a drop-down menu with a list of major components (the ones that actually have an associated fault frequency or frequencies). Upon receiving a selection of a particular component from the menu, the tool may automatically create a band alarm to monitor for faults associated with the selected component.

Figure 6:
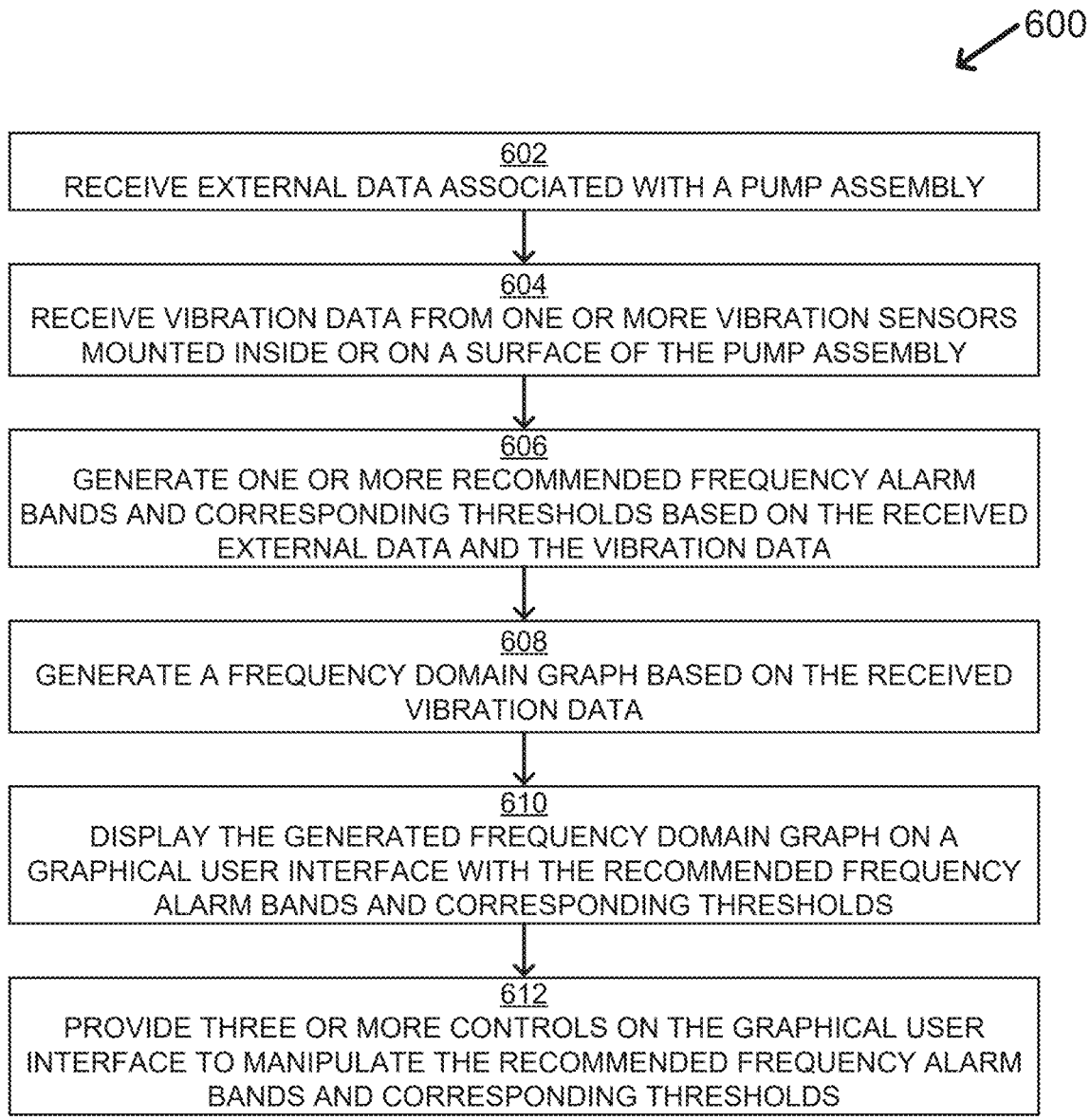
FIG. 6 is a flow diagram illustrating operations of an example monitoring system with configurable graphical vibration band alarms for pump monitoring, arranged in accordance with at least some embodiments described herein.

FIG. 6 is a flow diagram illustrating operations of an example monitoring system with configurable graphical vibration band alarms for pump monitoring, arranged in accordance with at least some embodiments described herein.

Example methods may include one or more operations, functions or actions as illustrated by one or more of blocks 602, 604, 606, 608, 610 and 612, and may in some embodiments be performed by a computing device or may be performed by an apparatus controlling operations of a system such as the one described in FIG. 2. The operations described in the blocks 602-612 may also be stored as computer-executable instructions in a computer-readable medium of a computing device.

An example process to provide configurable graphical vibration band alarms for pump (or similar rotating machine) monitoring may begin with block 602, "RECEIVE EXTERNAL DATA ASSOCIATED WITH A PUMP ASSEMBLY," where a computing device such as monitoring device 208, a configuration device 216, or a remote device 210 in FIG. 2 may receive external data such as historic operational data for the specific pump or generic operational data for the family of pumps, environmental data for a location of the pump, and/or user input (e.g., configuration information).

Block 602 may be followed by block 604, "RECEIVE VIBRATION DATA FROM ONE OR MORE VIBRATION SENSORS MOUNTED INSIDE OR ON A SURFACE OF THE PUMP ASSEMBLY," where electrical or optical signals carrying information associated with detected vibration from one or more locations of the pump assembly (e.g., bearing housing, pump housing, shaft, etc.) may be received. The vibration data may be received in time domain and converted to frequency domain (e.g., through an FFT operation) or received in frequency domain from the vibration sensors.

Block 604 may be followed by block 606, "GENERATE ONE OR MORE RECOMMENDED FREQUENCY ALARM BANDS AND CORRESPONDING THRESHOLDS BASED ON THE RECEIVED EXTERNAL DATA AND THE VIBRATION DATA," where physical and/or statistical models, as well as, machine-specific historic data and user input may be used to generate default values for start and end frequencies and thresholds for one or multiple frequency alarm bands.

Block 606 may be followed by block 608, "GENERATE A FREQUENCY DOMAIN GRAPH BASED ON THE RECEIVED VIBRATION DATA," where a frequency domain graphic representation of the vibration data may be generated.

Block 608 may be followed by block 610, "DISPLAY THE GENERATED FREQUENCY DOMAIN GRAPH ON A GRAPHICAL USER INTERFACE WITH THE RECOMMENDED FREQUENCY ALARM BANDS AND CORRESPONDING THRESHOLDS," where the frequency domain graphic representation of the vibration data may be displayed on a graphical user interface together with the computed default values for start and end frequencies and thresholds (of one or more frequency alarm bands).

Block 610 may be followed by block 612, "PROVIDE THREE OR MORE CONTROLS ON THE GRAPHICAL USER INTERFACE TO MANIPULATE THE RECOMMENDED FREQUENCY ALARM BANDS AND CORRESPONDING THRESHOLDS," where controls such as slider buttons or similar interactive graphical elements may be displayed to allow a user to modify the default values for start and end frequencies and thresholds of each frequency alarm band.

The operations included in the process described above are for illustration purposes and may be implemented by similar processes with fewer or additional operations, as well as in different order of operations using the principles described herein. The operations described herein may be executed by one or more processors operated on one or more computing devices, one or more processor cores, and/or specialized processing devices, among other examples.

Disclosed herein are methods and devices to efficient vibration band alarm configuration tool facilitates reliable settings and minimizes required knowledge of machinery and vibration analysis by displaying data and computations pertaining to the data produced by a vibration sensor attached to the machine and recorded by a data acquisition system. The benefits of the presently disclosed monitoring system are numerous. In addition to the efficiency and reduction of machine or vibration analysis knowledge, further benefits may include easier detection/prediction of potential equipment failures before the rotating machine stops or worse, a catastrophic failure occurs. Recommended default values for frequency alarm bands may simplify the recognition of features that represent system components and anomalies pertinent to machine health monitoring. The sliders may allow efficient changing of the settings while providing visual feedback that the areas of concern are contained within the current settings. To further aid a user, data collected through user input, other computations such as run speed, and harmonic cursors may also be displayed. A system according to examples may also allow selection of various vibration data sets from different time points or different collection axes with real time information update allowing the user to confirm their observation quickly.

As a result of the efficient and user-friendly detection of anomalies, components may be replaced avoiding waste of resources for early replacement or equipment downtime due to actual failure, which may be expected in schedule-based maintenance. In some examples, communicatively coupled system that allows access to vibration data remotely may avoid a need to contact manufacturer or service entities, as well as, site visits for each detected anomaly.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only and is not intended to be limiting.

The herein described subject matter sometimes illustrates different components contained within, or connected with, different other components. Such depicted architectures are merely examples, and in fact, many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A monitoring system for a pump assembly to provide graphically defined frequency band alarms, the monitoring system comprising:
    a vibration sensor mounted in a housing of the pump assembly;
    a graphical user interface; and
    a computing device communicatively coupled to said vibration sensor;
    said computing device including
        a communication sub-system to facilitate communication with said vibration sensor and a remote device,
        a memory configured to store instructions, and
        a processor coupled to said communication sub-system and said memory;
    said processor, in conjunction with the instructions stored in said memory, configured to
        (a) receive external data associated with the pump assembly,
        (b) receive vibration data from the vibration sensor,
        (c) generate a recommended frequency alarm band and a corresponding threshold based on the received external data and the vibration data;
        (d) generate a frequency domain graph based on the received vibration data, (e) display the generated frequency domain graph, on said graphical user interface, with the generated recommended frequency alarm band and the corresponding threshold, (f) provide one or more user activatable controls, on said graphical user interface, to manipulate the recommended frequency alarm band and the corresponding threshold, and (g) display, on said graphical user interface, an updated frequency domain graph and an updated corresponding threshold in response to receiving manipulation input through the one or more user activatable controls.

2. The monitoring system of claim 1, wherein said processor is configured to receive the vibration data from said vibration sensor as time domain data and convert to frequency domain data or receive the vibration data from said vibration sensor as frequency domain data.

3. The monitoring system of claim 1, wherein said processor is configured to: generate the recommended frequency alarm band and the corresponding threshold by providing a start frequency, an end frequency, and the corresponding threshold to be superimposed with the frequency domain graph displayed on said graphical user interface, wherein the one or more user activatable controls on said graphical user interface comprise slider buttons configured to allow the user to modify values of the start frequency, the end frequency, and the corresponding threshold.

4. The monitoring system of claim 1, wherein said processor is further configured to: display a computed current threshold in conjunction with the recommended frequency alarm band and to re-compute the computed current threshold in response to receiving a manipulation of the recommended frequency alarm band.

5. The monitoring system of claim 1, wherein said processor is further configured to: display one or more of a run speed, bearing fault frequency, and a vane pass of the pump assembly captured at a time of vibration data capture and to select a unit of the threshold and a computed current threshold to be displayed based on a frequency range of the frequency alarm band.

6. The monitoring system of claim 1, wherein said processor is further configured to: receive a plurality of vibration data sets captured at different time points and along multiple orthogonal axes and to present the plurality of vibration data sets for selection to be displayed on the graphical user interface.

7. The monitoring system of claim 1, wherein the external data is stored in a database communicatively coupled to said computing device and includes historical data comprising one or more of generic pump specifications, specific pump specifications, historic performance data for the pump, or historic failure data for the pump, and environmental data comprising one or more of ambient temperature, ambient humidity, ambient pressure, ambient vibration levels, fluid pressure, fluid temperature, fluid viscosity, or a supply power condition.

8. The monitoring system of claim 1, wherein the vibration data is captured by one or more vibration sensors periodically, on-demand, or continuously.

9. A method to provide graphically defined frequency band alarms for a pump assembly, the method comprising:

(a) receiving external data associated with the pump assembly;

(b) receiving vibration data from a vibration sensor mounted in a housing of the pump assembly;

(c) generating a recommended frequency alarm band and a corresponding threshold based on the received external data and the vibration data;

(d) generating a frequency domain graph based on the received vibration data;

(e) displaying, through a computing device communicatively coupled to the vibration sensor, the generated frequency domain graph on a graphical user interface with the generated recommended frequency alarm band and the corresponding threshold;

(f) providing one or more controls on the graphical user interface to manipulate the recommended frequency alarm band and the corresponding threshold; and (g) displaying, through the computing device, an updated frequency domain graph and an updated corresponding threshold in response to receiving manipulation input through the one or more controls.

10. The method of claim 9, further comprising:

(h) generating the recommended frequency alarm band and the corresponding threshold by providing a start frequency, an end frequency, and the threshold to be superimposed with the frequency domain graph displayed on the graphical user interface, wherein the one or more controls on the graphical user interface comprise slider buttons configured to allow the user to modify values of the start frequency, the end frequency, and the threshold.

11. The method of claim 9, further comprising:

(h) displaying a computed current threshold in conjunction with the recommended frequency alarm band; and (i) re-computing the computed current threshold in response to receiving a manipulation of the frequency alarm band.

12. The method of claim 9, further comprising:

(h) displaying one or more of a run speed, bearing fault frequency, and a vane pass of the pump assembly captured at a time of vibration data capture; and (i) selecting a unit of the threshold and a computed current threshold to be displayed based on a frequency range of the frequency alarm band.

13. The method of claim 9, further comprising:

(h) receiving a plurality of vibration data sets captured at different time points and along three orthogonal axes; and (i) presenting the plurality of vibration data sets for selection to be displayed on the graphical user interface.

14. The method of claim 9, further comprising:

(h) generating multiple recommended frequency alarm bands and corresponding thresholds based on the received external data and the vibration data;

(i) displaying, through the computing device, the generated frequency domain graph with the generated recommended frequency alarm bands and the corresponding thresholds; and (j) providing one or more controls on the graphical user interface to manipulate for each of the recommended frequency alarm bands and the corresponding thresholds.

15. The method of claim 9, further comprising:

(h) configuring the vibration sensor to collect vibration data periodically, on-demand, or continuously.

16. An interactive graphical user interface to provide graphical frequency alarm bands for a rotating machine, the graphical user interface displayed through a computing device communicatively coupled to a vibration sensor, the interactive graphical user interface comprising:

a displayed frequency domain graph that represents vibration data received from the vibration sensor mounted in a housing of the rotating machine;

a displayed more operational parameter values captured at a time of capture of the vibration data;

a displayed frequency alarm band indicated by a start frequency and an end frequency;

a displayed threshold for the frequency alarm band, wherein the frequency alarm band and the threshold are generated based on the received vibration data and received external data;

a displayed computed current threshold in conjunction with the frequency alarm band; and displayed interactive controls, associated with the start frequency, the end frequency, and the threshold, to allow a user to manipulate the start frequency, the end frequency, and the threshold.

17. The interactive graphical user interface of claim 16, wherein the vibration data is received from the vibration sensor as time domain data and converted to frequency domain data or received from the vibration sensor as frequency domain data.

18. The interactive graphical user interface of claim 16, wherein the displayed interactive controls comprise slider buttons manipulatable by one or more of a touch input, a mouse input, a keyboard input, an eye tracking input, or a voice input.

19. The interactive graphical user interface of claim 16, wherein the displayed computed current threshold is re-computed in response to receiving a manipulation of the frequency alarm band and a unit of the threshold and the displayed computed current threshold are selected based on a frequency range of the frequency alarm band.

* * * * *